United States Patent
Bone et al.

(10) Patent No.: US 11,944,077 B2
(45) Date of Patent: Apr. 2, 2024

(54) SYSTEM AND METHOD FOR AN ANIMAL PUZZLE BOWL FOR MENTAL STIMULATION OF SENIOR ANIMALS

(71) Applicant: Pawtology LLC, St. Louis, MO (US)

(72) Inventors: Stacey Bone, Olathe, KS (US); Jeffrey Harms, St. Louis, MO (US)

(*) Notice: Subject to any disclaimer, the term of this patent is extended or adjusted under 35 U.S.C. 154(b) by 173 days.

(21) Appl. No.: 17/520,300

(22) Filed: Nov. 5, 2021

(65) Prior Publication Data
US 2023/0145216 A1     May 11, 2023

(51) Int. Cl.
*A01K 5/01*     (2006.01)
*A01K 15/02*     (2006.01)

(52) U.S. Cl.
CPC .......... *A01K 5/0114* (2013.01); *A01K 5/0142* (2013.01); *A01K 15/025* (2013.01)

(58) Field of Classification Search
CPC ... A01K 5/0114; A01K 5/0142; A01K 15/025
USPC ....................................... 119/62, 61.53, 61.55
See application file for complete search history.

(56) References Cited

U.S. PATENT DOCUMENTS

| | | | | |
|---|---|---|---|---|
| 2,972,979 | A * | 2/1961 | Struck | A01K 5/01 30/131 |
| 4,505,228 | A * | 3/1985 | Scott | A01K 5/025 119/62 |
| 4,576,118 | A * | 3/1986 | Meadows | A01K 5/0114 220/502 |
| 4,798,173 | A * | 1/1989 | Wilgren | A01K 5/025 D30/129 |
| 5,546,894 | A * | 8/1996 | St-Pierre | A01K 5/025 119/61.55 |
| 5,752,464 | A * | 5/1998 | King | A01K 5/0114 220/4.24 |

(Continued)

FOREIGN PATENT DOCUMENTS

| | | | | |
|---|---|---|---|---|
| DE | 202008011741 | * | 8/2009 | ........... A01K 15/025 |
| DE | 202017100892 | * | 3/2017 | ........... A01K 5/0114 |

OTHER PUBLICATIONS

'Trixie Activity Poker Box Activity Strategy Game Dog Toy, Level 2'. Chewy [online]. Nov. 1, 2020 [retrieved on Oct. 6, 2023]. Retrieved from the Wayback Machine Internet Archive. <http://web.archive.org/web/20201101050453/https://www.chewy.com/trixie-activity-poker-box-activity/dp/146127> (Year: 2020).*

(Continued)

*Primary Examiner* — Joshua D Huson
*Assistant Examiner* — Brook Victoria Schmid
(74) *Attorney, Agent, or Firm* — Lisa Foundation Patent Law Clinic (57) ABSTRACT

An animal puzzle bowl is disclosed having a plurality of sockets and a lid with a coupling joint configured to couple with those sockets in a plurality of orientations. The lid may include elements such as a lip or grip for an animal to interact with to allow for opening of the lid so the animal may reach the contents of the bowl. The lids may also include holes so the animal may be encouraged to interact with the bowl by the sight or smell of food or other items of interest. The bowl base can include more than one bowl to allow for a combination of lids to be used. By varying the (Continued)

combination and orientation of the lids an animal must problem solve to reach a desired item in the bowl each time, thus mentally stimulating the animal.

15 Claims, 8 Drawing Sheets

(56) References Cited

U.S. PATENT DOCUMENTS

| | | | | |
|---|---|---|---|---|
| 6,138,608 | A * | 10/2000 | Mosley | A01K 5/025 |
| | | | | 119/72 |
| 7,263,949 | B1 * | 9/2007 | Seaford | A01K 7/00 |
| | | | | 119/51.5 |
| D676,619 | S * | 2/2013 | Hansen | A01K 5/0114 |
| | | | | D30/121 |
| 9,295,231 | B2 | 3/2016 | Parness | |
| 9,462,787 | B2 | 10/2016 | Christianson et al. | |
| 10,791,710 | B1 | 10/2020 | White | |
| D968,034 | S * | 10/2022 | Liang | D30/121 |
| 2008/0105205 | A1 * | 5/2008 | Goehring | A01K 5/0114 |
| | | | | 119/51.02 |
| 2010/0275855 | A1 * | 11/2010 | Ottosson | A63F 3/00 |
| | | | | 119/707 |
| 2014/0202396 | A1 | 7/2014 | Hansen | |
| 2018/0368357 | A1 * | 12/2018 | Yang | A01K 15/025 |

OTHER PUBLICATIONS

Author unknown, Nina Ottosson by Outward Hound Twister Puzzle Game Dog Toy, Blue & Purple https://www.chewy.com/nina-ottosson-by-outward-hound/dp/175424?utm_source=google-product&utm_medium=cpc&utm_campaign=hg&utm_content=Nina%20Ottosson%20by%20Outward%20Hound&utm_term=&gclid=Cj0KCQjwmluDBhDXARIsAFITC_72nNpNKwCbNNV333T_tmBI1cpU2VkmsickVJ2JgSkoXOf7pz3FqdYaAqxUEALw_wcB (Last Accessed: Dec. 11, 2023 at 10:12 AM).

Author unknown, Nina Ottosson by Outward Hound Brick Puzzle Game Dog Toy https://www.chewy.com/nina-ottosson-by-outward-hound-brick/dp/175425?utm_source=google-product&utm_medium=cpc&utm_campaign=hg&utm_content=Nina%20Ottosson%20by%20Outward%20Hound&utm_term=&gclid=Cj0KCQjwmluDBhDXARIsAFITC_5VScFMdDhSsHBaKzSQH0Alb2bL8gRsF6yeb69pfvkgq-CWNOY0ljwaAhNsEALw_wcB# (Last Accessed: Dec. 11, 2023 at 10:25 AM).

Author unknown, TRIXIE Activity Poker Box Activity Strategy Game Dog Toy, Level 2 https://www.chewy.com/trixie-activity-poker-box-activity/dp/146127 (Last Accessed: Dec. 11, 2023 at 10:15 AM.

* cited by examiner

SYSTEM AND METHOD FOR AN ANIMAL PUZZLE BOWL FOR MENTAL STIMULATION OF SENIOR ANIMALS

BACKGROUND

1. Field of the Invention

The present invention relates to systems and methods for providing mental stimulation to animals. More particularly, the invention relates to systems and methods for stimulating older dogs via puzzle bowls using a plurality of lid positions.

2. Description of Related Art

It is known in the field of dog psychology that mental stimulation is important to long-term health of a dog. Many dog puzzle bowls exist that require pushing, prodding, and various levels of problem solving for an animal to access a treat or toy. It is known in the art to use simple sliding block puzzles or lids over a food dish in order to encourage a dog or other animal to work through the puzzle to access their food. Many of these puzzles involve numerous small pieces that need to be placed back on after each use. Small pieces like screws or other connectors can present a choking hazard, and some puzzle bowls are formed with interlocking plastic pieces or from a minimal number of parts to avoid these choking hazards. However, this often leads to those puzzle bowls having a greater limit to the directions and means of articulating lids or other sections of a puzzle bowl.

So as to reduce the complexity and length of the Detailed Specification, and to fully establish the state of the art in certain areas of technology, Applicant(s) herein expressly incorporate(s) by reference all of the following materials identified in each numbered paragraph below.

Hansen Patent Application No. 2014/0202396 A1 uses a rotating triad of lidded bowls and a rotating triad that blocks the lids from being lifted. The bowls have scent holes to allow an animal to detect the scent of a treat in the bowls to encourage them to interact with the toy.

Parness U.S. Pat. No. 9,295,231 B2 is a wobbling food dispenser puzzle toy. When an animal knocks one part of the food dispenser down it dispenses a small amount of food before returning to an equilibrium position. This requires the animal to knock the food dispenser into a dispensing position multiple times to dispense food items.

Christianson et al. U.S. Pat. No. 9,462,787 B2 is a spherical pet puzzle toy and treat dispenser. A motor assembly in the toy allows it to return to an upright orientation after being pushed around and causing it to dispense treats in response to being pushed into a non-equilibrium position by the pet.

White U.S. Pat. No. 10,791,710 is a scent training assembly for training detection or sniffer dogs. The assembly involves a scent assembly in the middle of the dish with a plurality of scent holes over scent pods in a compartment in the dish.

Applicant(s) believe(s) that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), Applicant(s) will amend the specification to expressly recite the essential material that is incorporated by reference as allowed by the applicable rules.

SUMMARY

The present invention provides among other things a system and method for stimulating senior animals by allowing for the various lids of a puzzle bowl to be placed in a plurality of potential positions. By varying lid type, orientation, and grip points an animal is forced to exercise problem-solving skills and is thereby mentally stimulated when interacting with the puzzle bowl system described below.

Implementations of an animal puzzle bowl may comprise a base having a top surface and a bottom surface, a bowl formed in the top surface, the bowl comprising a bowl edge, the bowl edge having a plurality of sockets and coupled to a bowl side, the bowl side extending to a bowl base distal to the bowl edge. A lid may also be used, the lid having a first end and a second end, the first end having a coupling joint, the coupling joint configured to couple in a plurality of orientations with the plurality of sockets and further configured such that the lid rotates along a lateral axis of the lid between an open position and a closed position.

Particular aspects may include one or more of the following features. The lid may further comprise a lip coupled to the lid distal to the coupling joint, the lip curving to terminate at an angle acute to a longitudinal axis of the lid, such that when the coupling joint is coupled with the socket and in the closed position, the lip extends upward from the top surface of the base. The lid may further comprise a grip extending from a substantially medial portion of the lid. The lid may further comprise a plurality of holes. The bowl edge may further comprise a chamfer. The animal puzzle bowl may also comprise a second lid having a top surface and a bottom surface, the top surface having a grip extending at a portion substantially medial to the top surface, and the bottom surface having a rim configured to seat within the bowl edge. The base may be formed of at least one of polypropylene, polyethylene terephthalate, high-density polyethylene, low-density polyethylene, and polycarbonate. The bottom surface may further comprise a raised grip section.

Implementations of a method for engaging with an animal may comprise placing a treat into an animal puzzle bowl. The animal puzzle bowl may comprise a base having a top surface and a bottom surface, a bowl formed in the top surface, the bowl comprising a bowl edge, the bowl edge having a plurality of sockets and coupled to a bowl side, the bowl side extending to a bowl base distal to the bowl edge. The animal puzzle bowl may further comprise a lid having a first end and a second end, the first end having a coupling joint, the coupling joint configured to couple in a plurality of orientations with the plurality of sockets and further configured such that the lid rotates along a lateral axis of the lid between an open position and a closed position. The method may further include closing the lid over the treat and presenting the animal puzzle bowl to an animal for interaction.

Particular aspects of the method may include one or more of the following features. The lid may further comprise a lip coupled to the lid distal to the coupling joint, the lip curving to terminate at an angle acute to a longitudinal axis of the lid, such that when the coupling joint is coupled with the socket and in the closed position, the lip extends upward from the top surface of the base. The lid may further comprise a grip extending from a substantially medial portion of the lid. The lid may further comprise a plurality of holes. The bowl edge may further comprise a chamfer. The animal puzzle bowl may further comprises a second lid having a top surface and a bottom surface, the top surface having a grip extending at a portion substantially medial to the top surface, and the bottom surface having a rim configured to seat within the bowl edge. The base may be formed from one or more of polypropylene, polyethylene terephthalate, high-density polyethylene, low-density polyethylene, and polycarbonate.

Implementations of an animal puzzle bowl may comprise a base having a top surface and a bottom surface, two or more bowls formed in the top surface, the two or more bowls each comprising a bowl edge, the bowl edge having a plurality of sockets and coupled to a bowl side, the bowl side extending to a bowl base distal to the bowl edge. The animal puzzle bowl further comprises a lid having a first end and a second end, the first end having a coupling joint, the coupling joint configured to couple in a plurality of orientations with the plurality of sockets and further configured such that the lid rotates along a lateral axis of the lid between an open position and a closed position.

Particular aspects of the animal puzzle bowl may include one or more of the following features. The lid may further comprise a lip coupled to the lid distal to the coupling joint, the lip curving to terminate at an angle acute to a longitudinal axis of the lid, such that when the coupling joint is coupled with the socket and in the closed position, the lip extends upward from the top surface of the base. The animal puzzle bowl may further comprise a second lid having a top surface and a bottom surface, the top surface having a grip extending at a portion substantially medial to the top surface, and the bottom surface having a rim configured to seat within the bowl edge. The lid may further comprise a plurality of holes. The lid may further comprise a grip extending from a substantially medial portion of the lid.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographers, to use only the plain and ordinary meaning of terms in the specification and claims unless he clearly states otherwise and then further, expressly sets forth the "special" definition of that term and explains how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of 35 U.S.C. § 112(f). Moreover, even if the provisions of 35 U.S.C. § 112(f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DETAILED DESCRIPTION and DRAWINGS, and from the CLAIMS.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Figure 1:
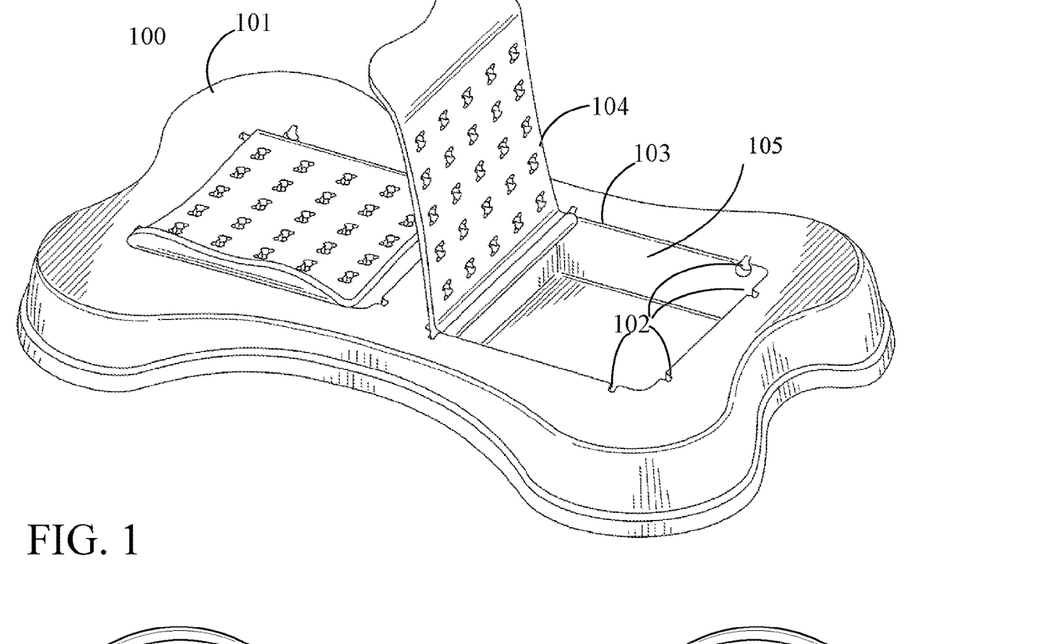
FIG. 1 depicts a perspective view of an animal puzzle bowl with an embodiment of the lids, one in an open position and one in a closed position.

In one application, the present invention comprises a base having bowls and a plurality of sockets for connecting a lid in various positions. Referring now to FIG. 1, an exemplary embodiment of an animal puzzle bowl 100 is shown. In these and other embodiments a base is formed from suitable materials with a top surface 101 and a bottom surface. In many embodiments the top surface ends at a side edge 103 of a bowl, with a plurality of sockets 102 along the side edge 103. In some embodiments the side edge may be a chamfer or bevel leading to the bottom of the bowl. A lid 104 may be coupled with these sockets such that it can rotate between an open and closed position.

Figure 2:
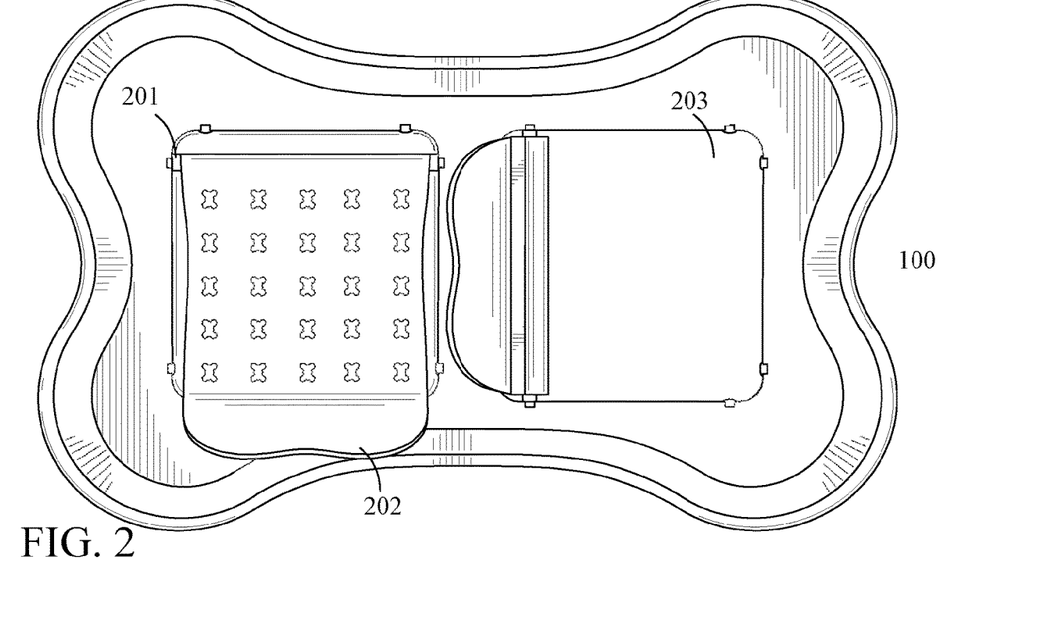
FIG. 2 depicts a top view of an animal puzzle bowl with one lid in an open position and the other in a closed position.
Figure 3:
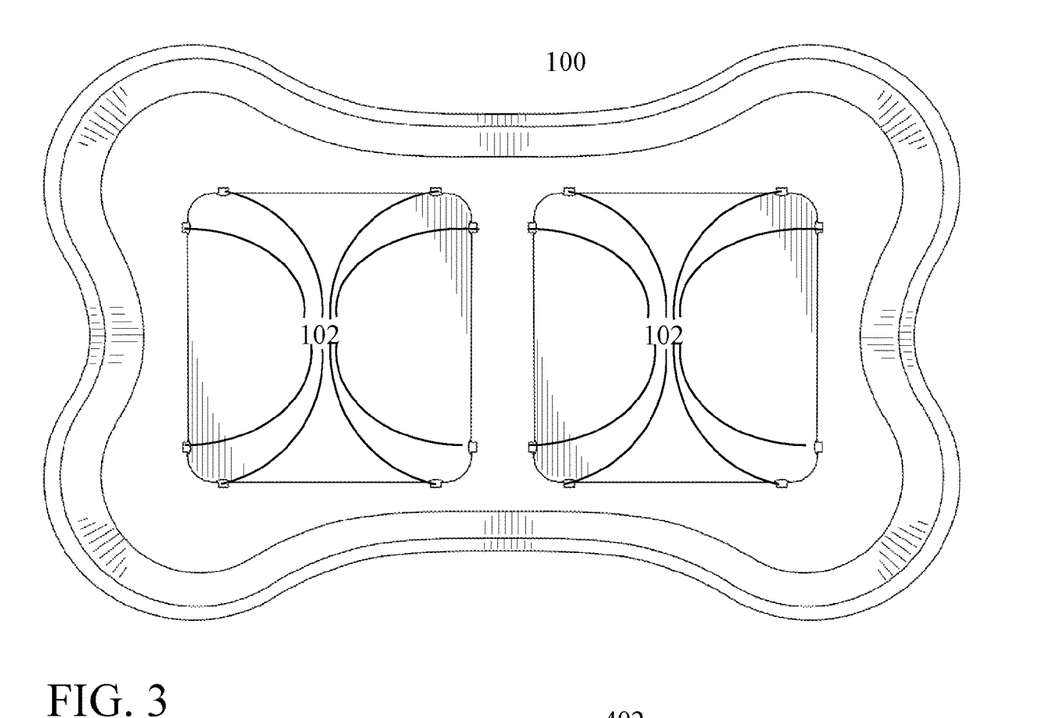
FIG. 3 depicts a top view of an animal puzzle bowl with both lids removed.

Referring now to FIG. 2, a top view of an exemplary embodiment of an animal puzzle bowl 100 is shown. In many embodiments a coupling joint 201 is disposed at one end of the lid, allowing the lid to rotate along a lateral axis between the open and closed position. In these and other embodiments a lip 202 of the lid may extend beyond the bowl edge. In many embodiments when the lid is in a closed position it covers a bowl base 203 in which a treat may be placed. A treat may include any object which would entice an animal to investigate the bowl. Exemplary treats may include items such as food, odorants, or toys. Referring now to FIG. 3, the lid may be removed to allow for free access to the bowl or for repositioning of the lid to a different pair of the sockets 102, or to allow for another lid type to be used.

Figure 4:
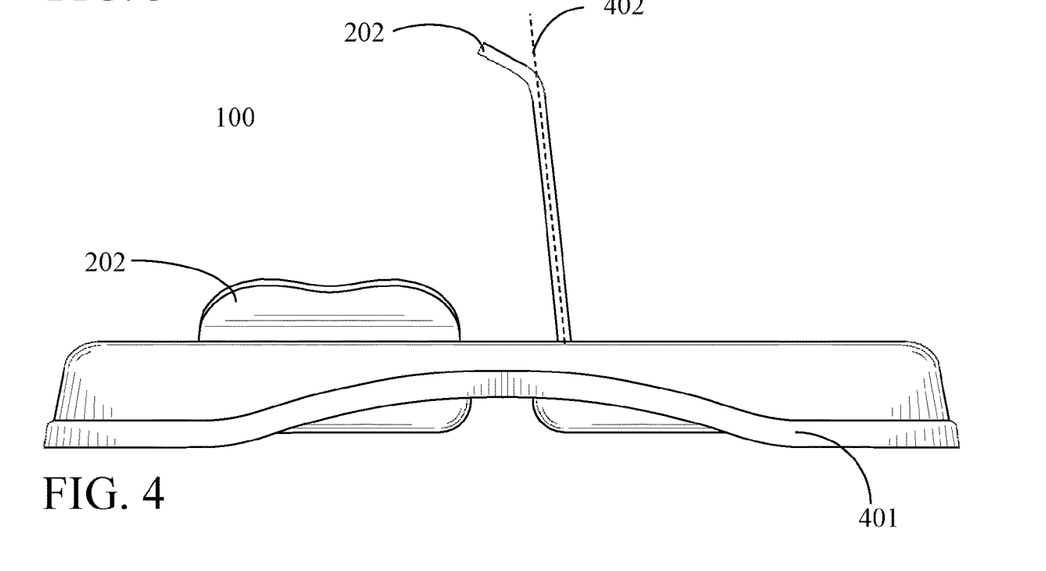
FIG. 4 depicts a front view of an animal puzzle bowl with one lid in an open position and the other in a closed position.

In many embodiments a lid with a lip may be used to provide a grip point. Referring now to FIG. 4 a side view of an exemplary embodiment of an animal puzzle bowl is shown. In many embodiments the lip 202 of the lid is disposed at the end opposite the coupling joint and forms an acute angle with a longitudinal axis 402 of the lid such that when force is applied along the longitudinal axis by an animal or user an upward force is exerted moving the lid between a closed and open position. In some embodiments rubber or other anti-slip materials may be used along a base edge 401 to resist movement of the animal puzzle bowl in response to force exerted on the lip 202 of the lid.

Figure 5:
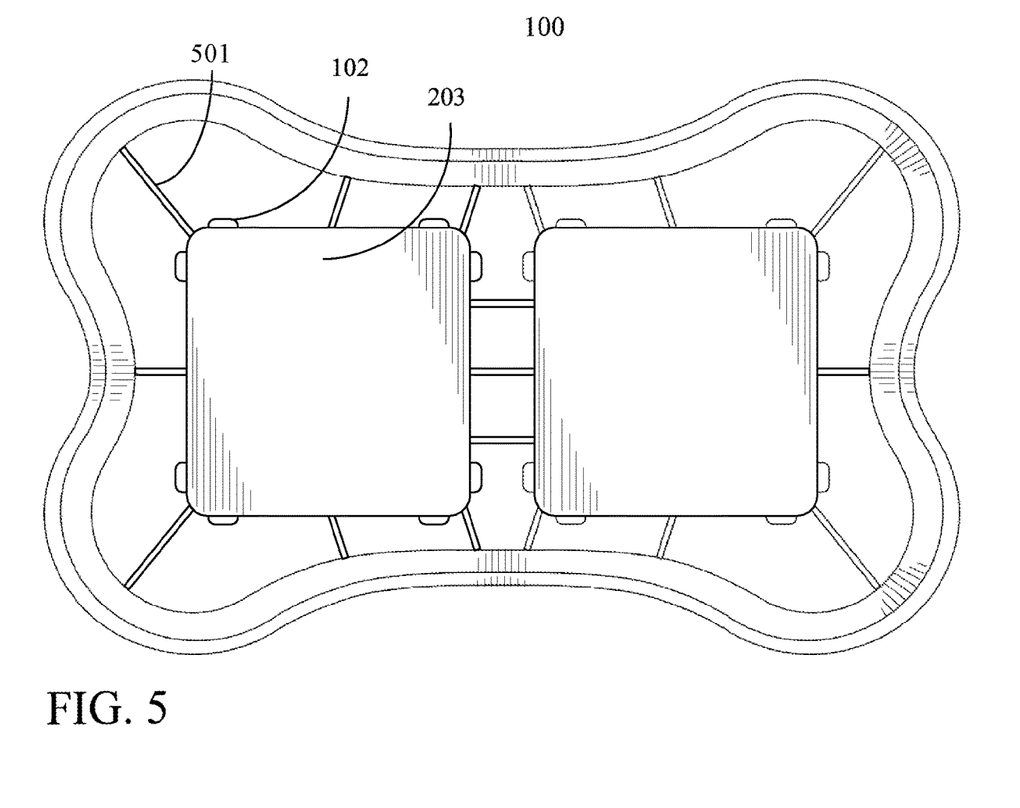
FIG. 5 depicts a bottom view of an animal puzzle bowl.

Referring now to FIG. 5, a bottom view of an exemplary embodiment of an animal puzzle bowl is shown. In many embodiments a structural rib 501 may be used to support the bowl's position within the base. For reference an embodiment of a socket 502 and bowl base 503 are shown in relation to the structural rib. These are shown for illustrative purposes and should not be construed as limiting the means or points for connecting the structural ribs. In many embodiments a socket 502 is formed out of the material of the bowl base 503.

Figure 6:
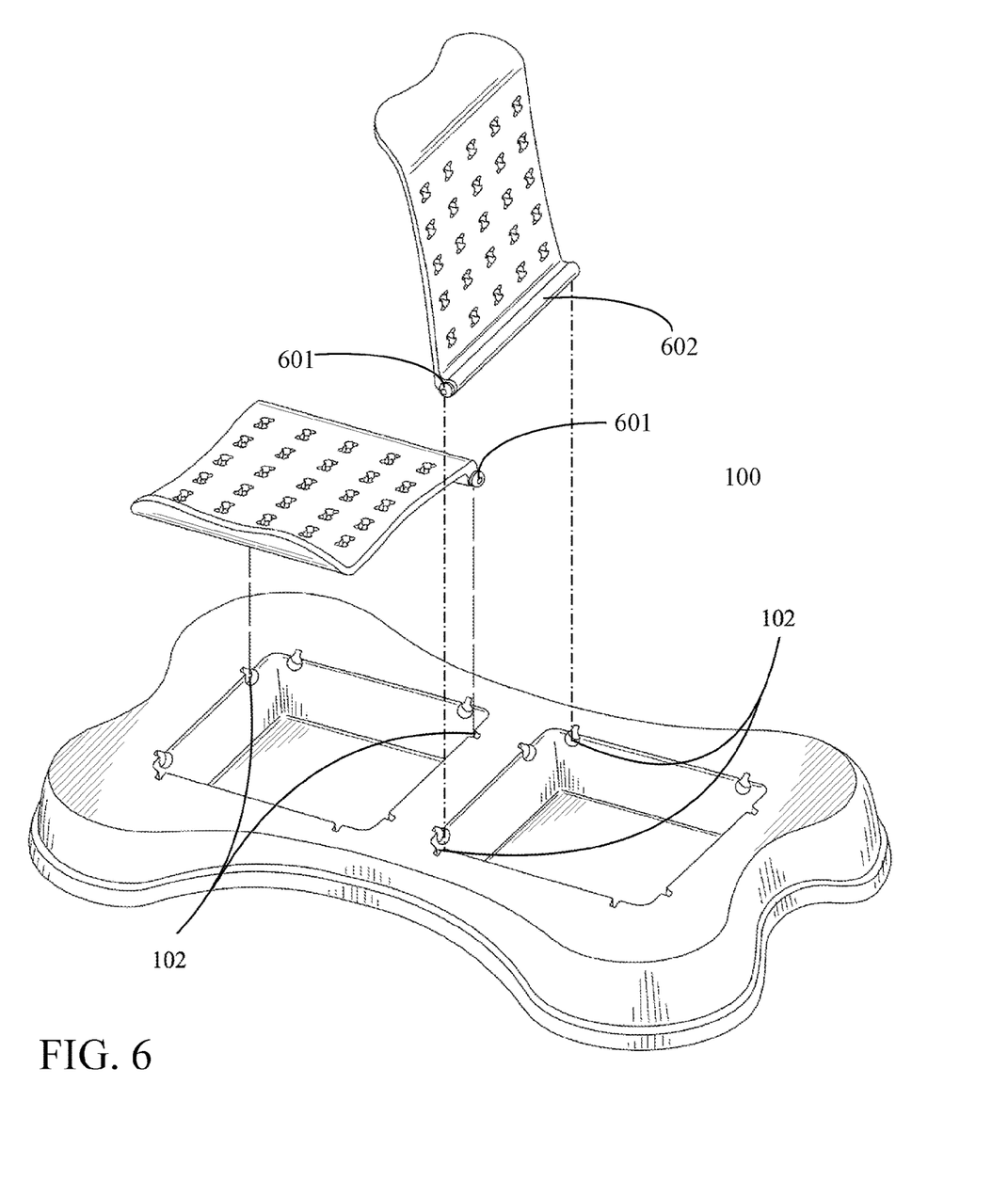
FIG. 6 depicts an exploded view of an animal puzzle bowl.

Referring now to FIG. 6, an exploded view of an exemplary embodiment of an animal puzzle bowl 100 is shown. In many embodiments the coupling joint 601 is disposed at each of the opposite ends of a joint rod 602 such that it aligns the coupling joint 601 with a pair of sockets 102. In these and other embodiments the coupling joint 601 may be configured to join with the pair of sockets via a snap-fit or other method appropriate for repeated uncoupling and recoupling of the lid.

Figure 7:
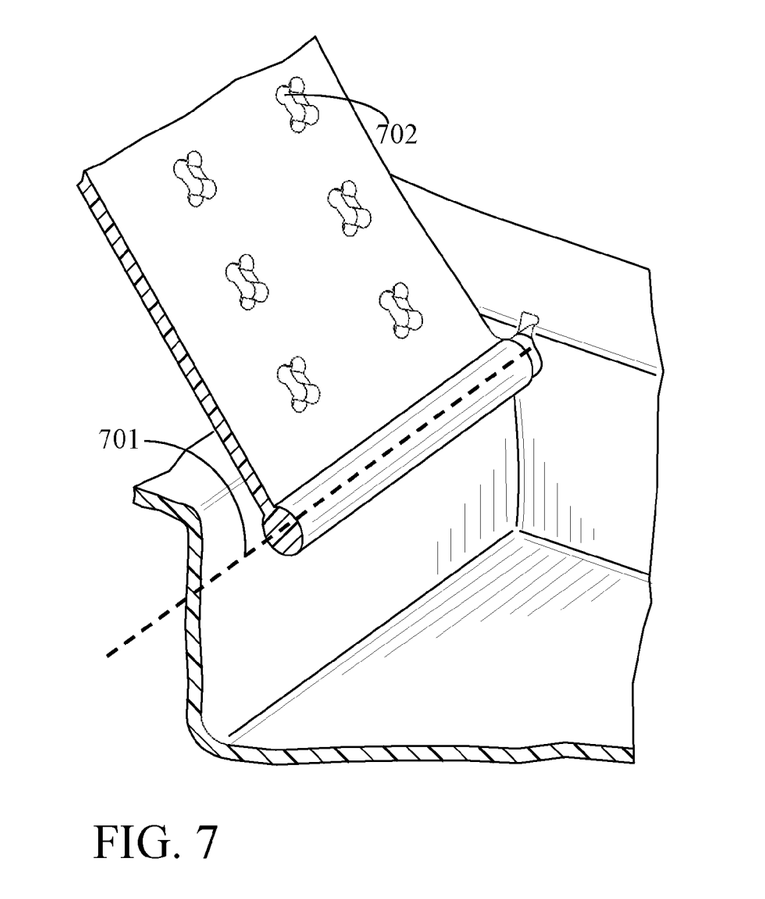
FIG. 7 depicts a cross-sectional view of an animal puzzle bowl lid and joint.
Figure 8:
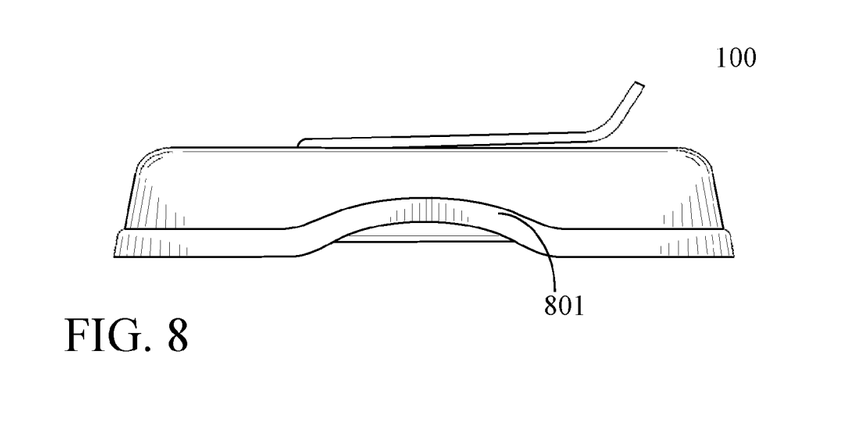
FIG. 8 depicts a side view of an animal puzzle bowl with lids in the closed position.
Figure 9:
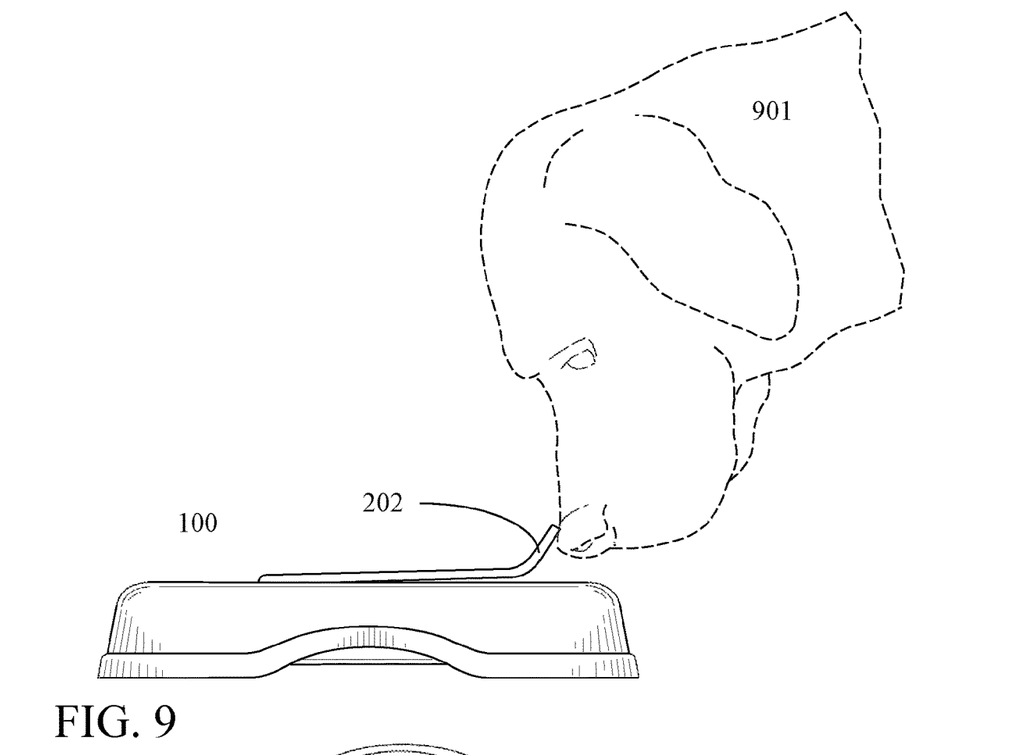
FIG. 9 depicts a side view of an animal puzzle bowl with lids in the closed position and an animal interacting with the animal puzzle bowl.

Referring now to FIG. 7, a cross-sectional view of an exemplary embodiment of an animal puzzle bowl is shown. As discussed above, in many embodiments when a coupling joint is coupled with the plurality of sockets, the lid may be rotated along a lateral axis 701 that runs through the joint rod. In many embodiments the lid may further comprise a plurality of holes 702 to allow an animal to detect the contents of the bowl. Referring now to FIG. 8, a side view of an exemplary embodiment of an animal puzzle bowl 100 is shown. In many embodiments a grip arch 801 may be present to allow a user to slide their fingers under the grip arch 801 for ease of lifting and moving the puzzle bowl 100. Referring now to FIG. 9, an exemplary embodiment of the puzzle bowl 100 being interacted with by an animal 901. In many embodiments the plurality of holes may allow an odor or visual stimulus to alert an animal 901 to the contents of the bowl. In many embodiments when the animal 901 applies a force to the lip 202 of the lid it may move the lid from a closed to an open position, allowing the animal 901 to access the contents of the bowl.

Figure 10:
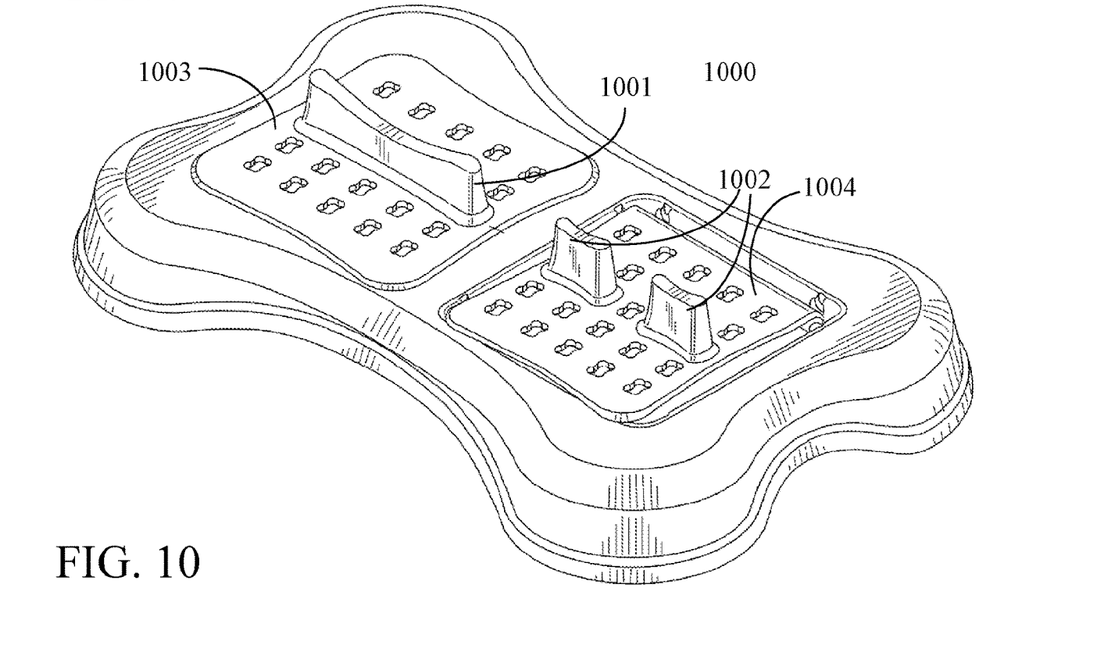
FIG. 10 is a perspective view of an animal puzzle bowl showing lids with grip points at a medial position on the lids.
Figure 11:
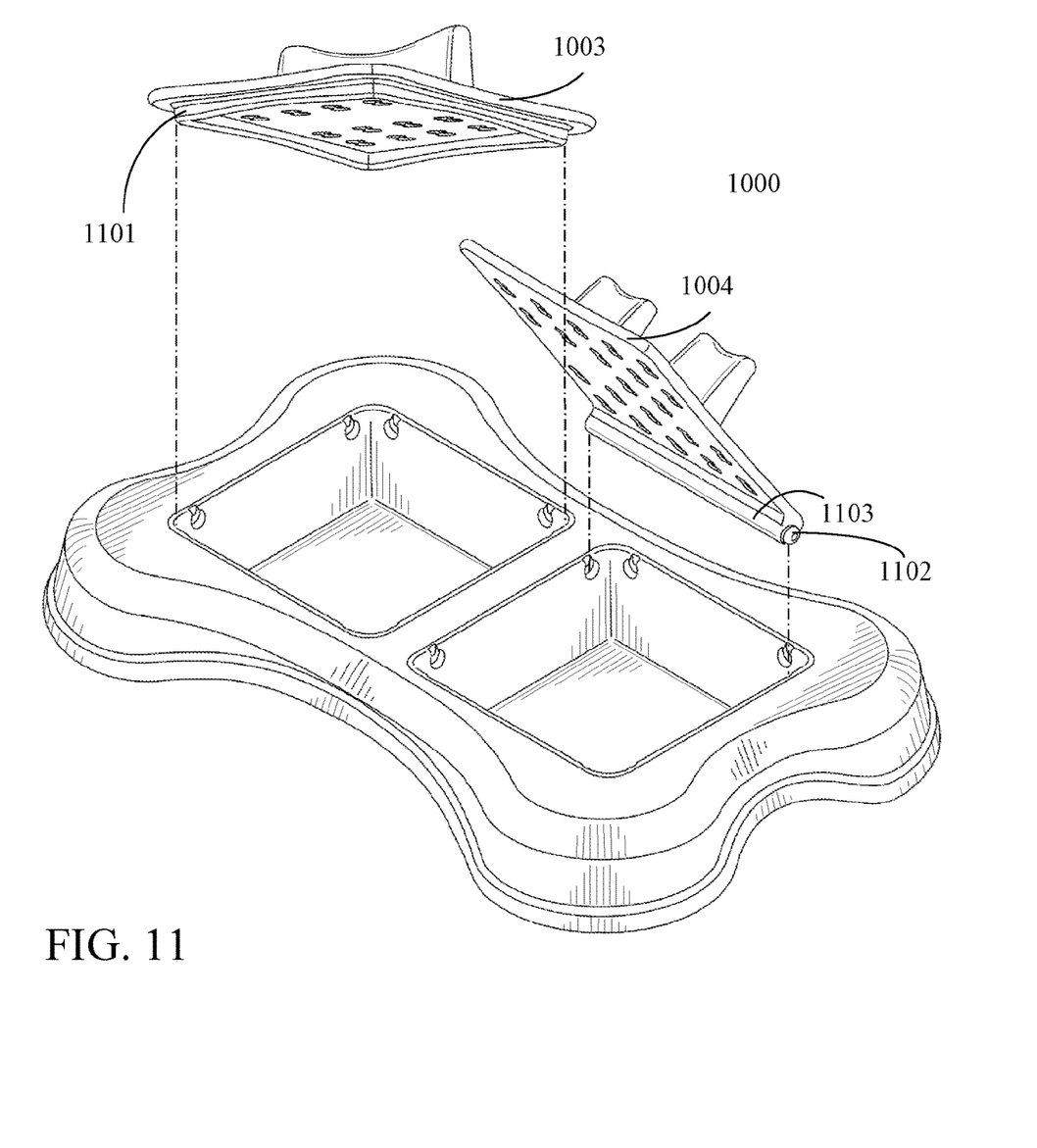
FIG. 11 is an exploded view of an animal puzzle bowl showing how different lid embodiments connect with the base.

Referring now to FIG. 10, an exemplary embodiment of an animal puzzle bowl 1000 is shown with alternative lids. In these and other embodiments a lid grip 1001 may be disposed at a medial point on the lid. In some embodiments a grip may comprise a pair of lid grips 1002. In many embodiments more than one type of lid may be used with the puzzle bowl such as a covering lid 1003 and a hinge lid 1004. Referring now to FIG. 11, an exploded view of an exemplary embodiment of an animal puzzle bowl 1000 is shown. In many embodiments the covering lid 1003 that can be seated over the bowl, held in place by a bowl lip 1101. In these and other embodiments a hinge lid 1004 that couples with the plurality of sockets via a coupling joint 1102 and rotates along a joint rod 1103 may also be used in a second bowl.

Figure 12:
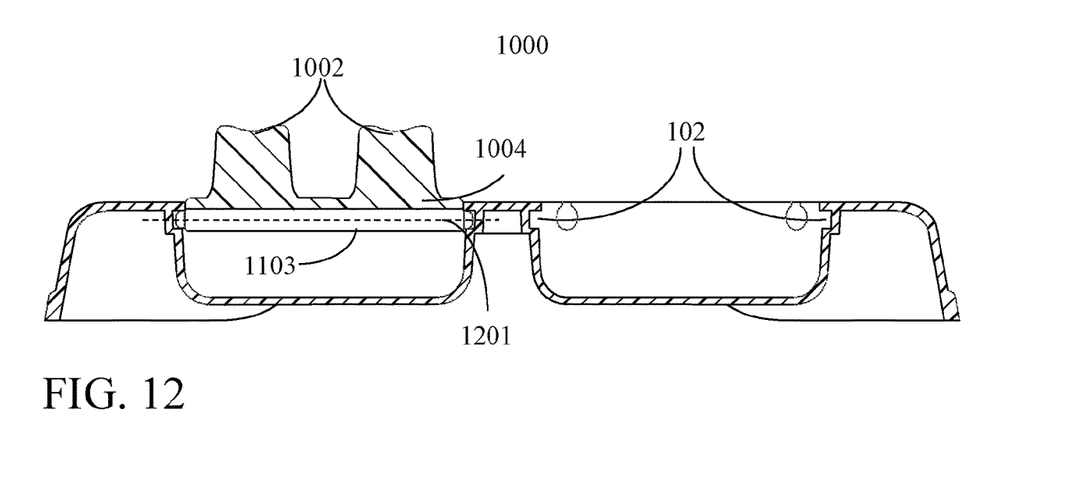
FIG. 12 is a cross-sectional view of an animal puzzle bowl showing one embodiment of a lid with a medial grip point and a hinge.
Figure 13:
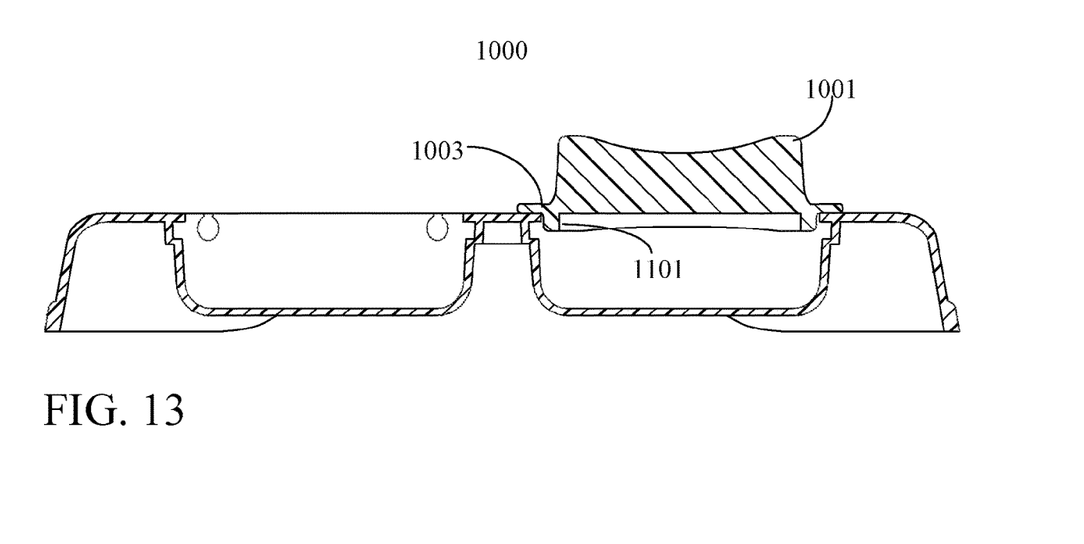
FIG. 13 is a cross-sectional view of an animal puzzle bowl showing one embodiment of a lid with a medial grip point and no hinge.

Referring now to FIG. 12 a cross-sectional view of an exemplary embodiment of an animal puzzle bowl using a pair of lid grips 1002 with a hinge lid 1004 is shown. The hinge lid 1004 is shown with coupled with a pair of sockets in one of the bowls, however in many embodiments the lid may be removed and alternatively placed in an open pair of sockets 102 in another bowl. In these and other embodiments, the lid may instead be removed and placed in a different pair of sockets within the same bowl as described above. As with the first lid described, the hinge lid is configured to rotate along a lateral axis 1201 of the joint rod 1103 of the hinge lid 1004. Referring now to FIG. 13 a cross-sectional view of an exemplary embodiment of an animal puzzle bowl 1000 using a lid grip 1001 with a covering lid 1003 is shown. In many embodiments the lip 1101 of the covering lid 1003 extends below the edge of the bowl, preventing the covering lid 1003 from sliding out of position laterally.

Any of the lid types described above may be used with any combination of lip or lid grip described above. The lid grip 1001 and pair of lid grips 1002 are shown associated with the covering lid 1003 and the hinge lid 1004 respectively in FIG. 10 for illustrative purposes, however this should not be construed as limiting a particular grip to a particular lid type.

We claim:

1. An animal puzzle bowl comprising:
a base having a top surface and a bottom surface, a bowl formed in the top surface, the bowl comprising a bowl edge, the bowl edge having a plurality of sockets and coupled to a bowl side, the bowl side extending to a bowl base distal to the bowl edge; and
a lid having a first end and a second end, the first end having a coupling joint, the coupling joint configured to couple in a first orientation with a first two of the plurality of sockets and in a second orientation with a second two of the plurality of sockets, at least one of the second two of the plurality of sockets being different from the first two of the plurality of sockets; the lid further configured such that the lid rotates along a lateral axis of the lid between an open position and a closed position; wherein the coupling joint is configured to couple in a third orientation with a third two of the plurality of sockets, at least one of the third two of the plurality of sockets being different from the first and second two of the plurality of sockets.

2. The animal puzzle bowl of claim 1 wherein:
the lid further comprises a lip coupled to the lid distal to the coupling joint, the lip curving to terminate at an angle acute to a longitudinal axis of the lid, such that when the coupling joint is coupled with at least one of the plurality of sockets and in the closed position, the lip extends upward from the top surface of the base.

3. The animal puzzle bowl of claim 1 wherein the lid further comprises a grip extending from a substantially medial portion of the lid.

4. The animal puzzle bowl of claim 1 wherein the lid further comprises a plurality of holes.

5. The animal puzzle bowl of claim 1 wherein the bowl edge further comprises a chamfer.

6. The animal puzzle bowl of claim 1 further comprising a second lid having a top surface and a bottom surface, the top surface having a grip extending at a portion substantially medial to the top surface, and the bottom surface having a rim configured to seat within the bowl edge.

7. The animal puzzle bowl of claim 1 wherein the base is formed of at least one of polypropylene, polyethylene terephthalate, high-density polyethylene, low-density polyethylene, and polycarbonate.

8. The animal puzzle bowl of claim 1 wherein the bottom surface further comprises a raised grip section.

9. The animal puzzle bowl of claim 1 wherein the coupling joint is configured to couple in a fourth orientation with a fourth two of the plurality of sockets, at least one of the fourth two of the plurality of sockets being different from the first, second, and third two of the plurality of sockets.

10. An animal puzzle bowl comprising:
a base having a top surface and a bottom surface, two or more bowls formed in the top surface, the two or more bowls each comprising a bowl edge, the bowl edge having a plurality of sockets and coupled to a bowl side, the bowl side extending to a bowl base distal to the bowl edge; and
a lid having a first end and a second end, the first end having a coupling joint, the coupling joint configured to couple in a first orientation with a first two of the plurality of sockets and in a second orientation with a second two of the plurality of sockets, at least one of the second two of the plurality of sockets being different from the first two of the plurality of sockets; the lid further configured such that the lid rotates along a lateral axis of the lid between an open position and a closed position; wherein the coupling joint is configured to couple in a third orientation with a third two of the plurality of sockets, at least one of the third two of the plurality of sockets being different from the first and second two of the plurality of sockets.

11. The animal puzzle bowl of claim 10 wherein the lid further comprises a lip coupled to the lid distal to the coupling joint, the lip curving to terminate at an angle acute to a longitudinal axis of the lid, such that when the coupling joint is coupled with at least one of the plurality of sockets and in the closed position, the lip extends upward from the top surface of the base.

12. The animal puzzle bowl of claim 10 wherein the animal puzzle bowl further comprises a second lid having a top surface and a bottom surface, the top surface having a grip extending at a portion substantially medial to the top surface, and the bottom surface having a rim configured to seat within the bowl edge.

13. The animal puzzle bowl of claim 10 wherein the lid further comprises a plurality of holes.

14. The animal puzzle bowl of claim 10 wherein the lid further comprises a grip extending from a substantially medial portion of the lid.

15. The animal puzzle bowl of claim 10 wherein the coupling joint is configured to couple in a fourth orientation with a fourth two of the plurality of sockets, at least one of the fourth two of the plurality of sockets being different from the first, second, and third two of the plurality of sockets.

* * * * *